(12) United States Patent
Hoefte et al.

(10) Patent No.: US 10,048,106 B2
(45) Date of Patent: Aug. 14, 2018

(54) LIQUID DOSING APPARATUS

(75) Inventors: Paulus Antonius Augustinus Hoefte, Astene (BE); Wolfram Beck, Meise (BE); Miranda Lambrigts, Eisden (BE)

(73) Assignee: The Procter & Gamble Company, Cincinnati, OH (US)

( * ) Notice: Subject to any disclaimer, the term of this patent is extended or adjusted under 35 U.S.C. 154(b) by 1004 days.

(21) Appl. No.: 13/274,586

(22) Filed: Oct. 17, 2011

(65) Prior Publication Data

US 2012/0097714 A1     Apr. 26, 2012

(30) Foreign Application Priority Data

Oct. 21, 2010  (EP) .................................... 10188349

(51) Int. Cl.
| | |
|---|---|
| *B65D 47/00* | (2006.01) |
| *G01F 13/00* | (2006.01) |
| *G01F 11/04* | (2006.01) |
| *G01F 11/26* | (2006.01) |
| *G01F 11/28* | (2006.01) |

(52) U.S. Cl.
CPC ............ *G01F 13/006* (2013.01); *G01F 11/04* (2013.01); *G01F 11/263* (2013.01); *G01F 11/265* (2013.01); *G01F 11/286* (2013.01)

(58) Field of Classification Search
CPC .... G01F 11/265; G01F 11/263; G01F 11/286; G01F 11/082; G01F 11/04; G01F 11/006; G01F 11/32

USPC .................. 222/477, 476, 212, 213, 491, 14
See application file for complete search history.

(56) References Cited

U.S. PATENT DOCUMENTS

| | | | |
|---|---|---|---|
| 2,730,270 A | 1/1956 | Heinemann | |
| 4,728,011 A * | 3/1988 | Schuster et al. | ............... 222/439 |
| 4,811,871 A * | 3/1989 | Wass et al. | .................... 222/477 |
| 4,946,080 A | 8/1990 | Vesborg | |
| 5,129,561 A | 7/1992 | Drobish | |
| 5,602,091 A | 2/1997 | Monson et al. | |
| 6,997,358 B2 * | 2/2006 | Wass | .............................. 222/439 |
| 8,528,795 B2 | 9/2013 | Law et al. | |
| 2008/0073383 A1 | 3/2008 | McDonald | |
| 2011/0198371 A1* | 8/2011 | Law et al. | .................... 222/477 |
| 2013/0270301 A1 | 10/2013 | Schoubben et al. | |

FOREIGN PATENT DOCUMENTS

| | | |
|---|---|---|
| EP | 0 274 256 A1 | 7/1988 |
| EP | 2 444 782 A1 | 4/2012 |
| GB | 2 201 395 A | 9/1988 |

(Continued)

*Primary Examiner* — Nicholas J Weiss
(74) *Attorney, Agent, or Firm* — John T. Dipre (57) ABSTRACT

The present invention relates to an apparatus and methods of repeatedly dispensing controlled doses of liquid. In one embodiment of the present invention, the apparatus includes a resiliently squeezable container, a cap operably connected to the container, a dosing chamber operably connected to the cap, at least one timer aperture located proximal to the discharge opening, a plunger, a valve retaining means located below the base, and a valve provided in the valve retaining means. The ratio of the total surface of the inlet openings and the timer apertures is from about 2 to about 17 and the viscosity of the liquid is from about 1 to about 600 mPa·s (measured at 10 s$^{-1}$ at 20° C.).

17 Claims, 6 Drawing Sheets

(56) References Cited

FOREIGN PATENT DOCUMENTS

| | | | | |
|---|---|---|---|---|
| WO | WO 9110115 A1 * | 7/1991 | ............. | G01F 11/26 |
| WO | WO-2005/049477 A2 | 6/2005 | | |
| WO | WO 2010023462 A1 * | 3/2010 | ............. | G01F 11/26 |

* cited by examiner

LIQUID DOSING APPARATUS

FIELD OF INVENTION

The present invention relates to an apparatus and means of repeatedly dispensing controlled doses of liquid. A preferred field of use is that of dosage devices for domestic or household use, containing detergents such as hard surface cleaning compositions or other cleaning preparations, fabric conditioners and the like. Other fields of use include dosage devices for manual and automatic dishwashing liquids, hair-care products and oral care applications such as mouth washes.

BACKGROUND OF THE INVENTION

It may be desirable to deliver repeated doses of liquid without requiring the recurring inversion of the container. It may also be desirable to provide a dosage system which does not rely solely on gravity for achieving said dosage. It may be particularly desirable to deliver said benefits whilst offering a compact and simple construction. This could be for a number of reasons, including flexibility and ease-of-use offered to the user, ease of manufacture, sustainability and cost effectiveness.

Various solutions exist providing a dosing device of a generally tubular shape, which is suitable to insert into an opening of a container, usually comprising a multiplicity of chambers arranged in such a way to allow fluid communication to occur in separate stages of the pouring maneuver (such as the one described in U.S. Pat. No. 5,129,561). The operation of these devices provides that a dosing chamber is filled up when the container is tilted; the content of said dosing chamber is subsequently transferred into a collecting chamber when the container is tilted back to the upright position; and the content exits the container when the latter is tilted again concurrently with a new dose entering said dosing chamber.

A number of disadvantages are introduced by such an arrangement that will be apparent to the person skilled in the art. For example such arrangement implies a bulky construction, particularly when larger doses are required. Indeed, for any given dose, the volume required for such a mechanism is multiplied by the number of chambers needed. Thus, manufacturing complexity is introduced leading to increased costs and unnecessary materials being used. Furthermore, the user is faced with the inconvenience of a bulky apparatus and the need for repeated tilting of the container for obtaining a dosed amount of liquid.

Other solutions include devices for dispensing measured amounts of liquid in connection with compressible liquid containers (such as those described in U.S. Pat. No. 2,730,270). Such devices usually comprise a collapsible container, a fluid passage conduit extending into said container, and a measuring tube. A dose is generated by squeezing the container in its upright position to allow liquid to flow through the fluid passage conduit and into the measuring tube. Once the measuring tube is filled, the device is tilted to pour the measured content. Finally, the device is tilted back to its upright position to start a new dose.

A disadvantage of such a system is the requirement of repeated tilting of the device between upright and inverted positions for multiple dosage. A further disadvantage is the dependency of the given dose on the volume of the measuring tube, thus introducing limitations as to compactness. Moreover, accuracy of dosage may be affected by any amount of liquid being sucked back into the container via the fluid passage conduit upon release of pressure.

Other devices provide metered doses of liquid from a container wherein the liquid is dispersed by squeezing or by pressurizing said container contents in some other way (such as those described in EP0274256A1). The user tilts the container and squeezes the container thus forming a pressure build up which forces the liquid through liquid outlet openings into a control chamber. In the meantime liquid flows through a small aperture at the bottom of said control chamber to force displacement of a piston towards a liquid outlet tube. Once the piston reaches the outlet tube the flow of liquid is stopped and the dose is complete. Tilting the container back to an upright position allows the piston to slowly return to its original position ready for a subsequent dosage. However, such arrangement still requires tilting the device upside down and upright for each dosage.

An attempt to solve this problem is described in WO 2005/049477. WO 2005/049477 discloses a device for providing metered doses of liquid from a container wherein the liquid is dispensed by squeezing of a container. The device disclosed comprises a dump valve arrangement provided at the back of a control chamber to allow rapid escape of liquid from the control chamber behind an obturator after a dose has been dispensed, to speed the return of the obturator to its rearward (starting) position. The dump valve closes during dispensing, under gravity or forward fluid pressure, and opens after dispensing, under gravity or reverse fluid pressure. However, such arrangement introduces disadvantages such as increased number of parts and jamming of the obturator following discharge of the liquid caused by left-behind residue accumulating at the bottom of the control chamber that subsequently dries up. This in turn may affect the consistency of the dosage.

Thus, there still remains a need for a simple, cost effective, efficient in use and compact apparatus and means of repeatedly dispensing controlled doses of liquid with improved drainage of the dosing chamber. There also remains a need for such devices having larger dose flexibility, improved dosing accuracy and dosing speed and consistency even at low squeeze forces.

It has been found that the apparatus of the present invention achieves a substantially constant liquid output which can be achieved substantially independently from pressure fluctuations caused by variations in the squeezing force and the fill level of the container during use.

A further advantage of the present invention is that substantially constant dosage is achieved even when close to product depletion.

Other objects, features and advantages of the invention will be better understood with reference to the attached drawings and the specification hereinafter.

SUMMARY OF THE INVENTION

A first aspect of the present invention is a dosing apparatus for dispensing a dose of liquid comprising a resiliently squeezable container, a cap operably connected to said container said cap comprising a nozzle, wherein said nozzle defines an orifice at its apex. A dosing chamber is operably connected to said cap, wherein said dosing chamber comprises a base having a discharge opening therein, sidewalls extending upwardly along the perimeter of said base and at least one inlet opening located proximal said sidewalls. At least one timer aperture is located proximal to said discharge opening. A plunger is provided in said dosing chamber and is moveable relative to said chamber so as to advance upon squeezing of said container, up to a blocking position. A valve retaining means is located below said base. A valve is provided in said retaining means wherein said valve is movable from an open position, allowing liquid flow through said discharge opening, and a closed position, where the valve blocks said discharge opening. Wherein, the ratio of the total surface of said inlet openings and said timer apertures is from 2 to 17, and wherein the viscosity of said liquid is from 1 to 600 mPa·s (measured at $10\ s^{-1}$ at 20° C.).

A second aspect of the present invention is a method of dosing with an apparatus comprising a resiliently squeezable container, a cap operably connected to said container said cap comprising a nozzle, wherein said nozzle defines an orifice at its apex. A dosing chamber is operably connected to said cap, wherein said dosing chamber comprises a base having a discharge opening therein, sidewalls extending upwardly along the perimeter of said base and at least one inlet opening located proximal said sidewalls. At least one timer aperture is located proximal to said discharge opening. A plunger is provided in said dosing chamber and is moveable relative to said chamber so as to advance upon squeezing of said container, up to a blocking position. A valve retaining means is located below said base. A valve is provided in said retaining means wherein said valve is movable from an open position, allowing liquid flow through said discharge opening, and a closed position, where the valve blocks said discharge opening. Said method comprising the steps of; orienting said apparatus top down; squeezing said container to generate a pressure of from 2 kPa to 12 kPa, for no more than 1.5 seconds, preferably no more than one second, to complete the dose; releasing the force from said container to permit said valve to open, release said liquid from said dosage chamber via said discharge opening and allow said plunger to return to its starting position; and optionally, squeezing again to begin a second dose without inverting said container.

DETAILED DESCRIPTION OF THE INVENTION

By the terms "a" and "an" when describing a particular element, we herein mean "at least one" of that particular element.

The term "dose" as used herein is defined as the measured amount of liquid to be delivered by the apparatus. The dose begins when the liquid first exits the nozzle and ends once the flow of said liquid stops.

By "substantially independently from pressure" as used herein it is meant that pressure causes less than 10% variation from the target measured dose.

By "substantially constant liquid output or dosage" as used herein it is meant that variation from the target measured dose is less than 10%.

By "resiliently squeezable" as used herein it is meant that the container returns to its original shape without suffering any permanent deformation once pressure is released therefrom.

The invention is directed to an apparatus (1) for repeatedly dosing a quantity of liquid. The apparatus (1) comprises a resiliently squeezable container (2), a cap (3) operably connected to the container, a dosing chamber (4) operably connected to said cap (3), a plunger provided in said dosing chamber (4), a valve retaining means (6), and a valve (7). The apparatus (1) may have a longitudinal axis (YY) extending along/or substantially parallel to, the centerline of the apparatus (1). Said longitudinal axis (YY) may also be parallel to the direction of a portion of the fluid flow during dispensing.

Figure 2:
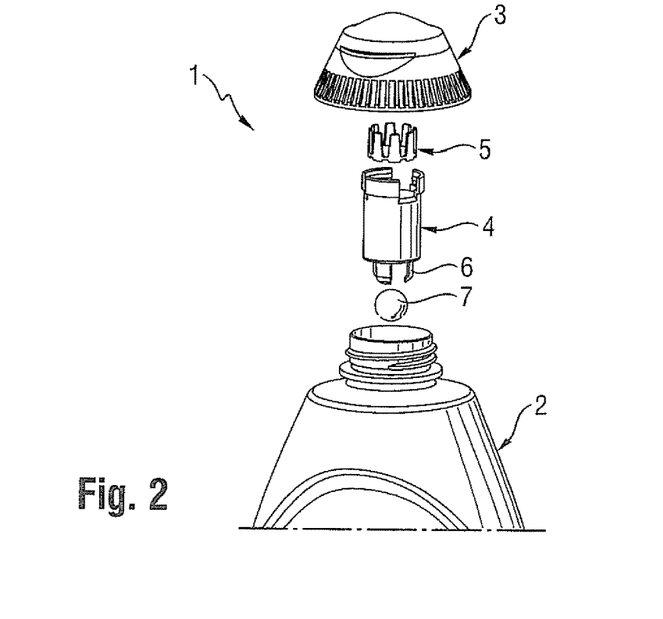
FIG. 2 is an exploded view of the dosing apparatus according to one embodiment of the present invention.
Figure 3:
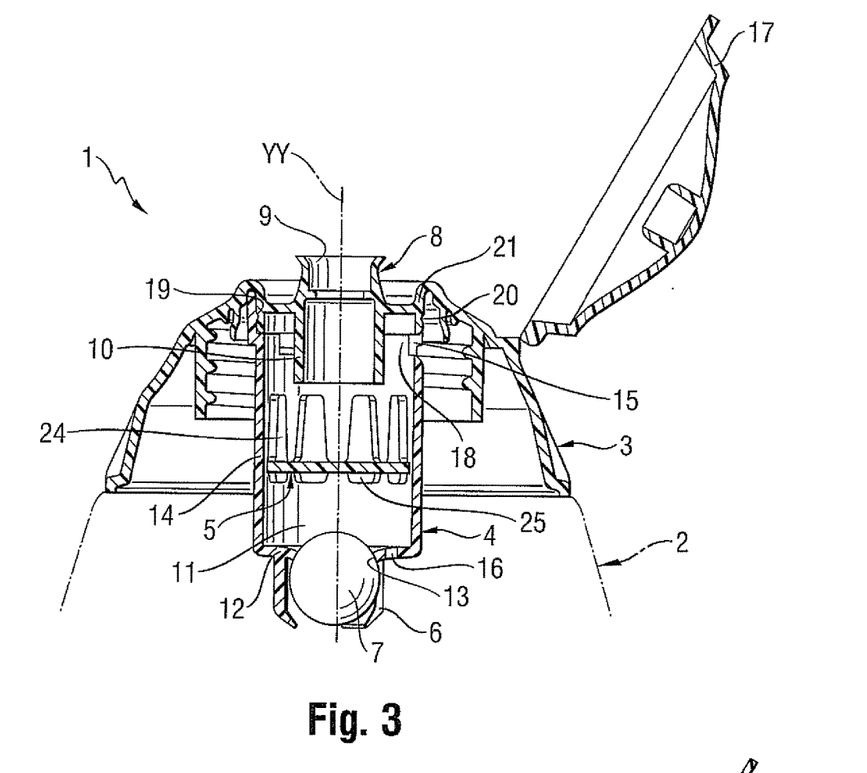
FIG. 3 is a cross-section taken along the line A-A of FIG. 1A of the dosing apparatus according to one embodiment of the present invention.

Referring to FIG. 2 and FIG. 3, the cap (3) comprises a nozzle (8) extending substantially parallel to the longitudinal axis (YY) defining an orifice (9) at its apex, and an entry tube (10) which extends downwardly and opposite said orifice (9). Preferably, said orifice (9) may comprise a slit valve to reduce and even eliminate dripping. The entry tube (10) may extend vertically downwardly substantially parallel to the longitudinal axis (YY) so as to at least partly enter a volume formed by the dosing chamber (4). The cap (3) may further comprise a top lid (17) capable of engaging with the nozzle (8) to provide a closing and sealing means. Preferably, the top lid (17) may be pivotable upon a pivot point (18) located on a surface of the cap (3). The person skilled in the art would understand that other closing features or cap constructions could also be used, such as twist, pull, push, screw or other caps know in the art.

The dosing chamber (4) comprises a base (12) having a discharge opening (13) located therein. Preferably, the discharge opening (13) is located at the centre of the base (12) to allow the liquid accumulated in the volume (11) of the dosing chamber (4) below the plunger to be quickly flushed back into the container (2) after squeezing. At least one timer aperture (16) is located proximal to the discharge opening (13). The dosing chamber (4) also has sidewalls (14) extending upwardly along the perimeter of the base (12) and have at least one inlet opening (15) located proximal to said sidewalls (14). Preferably, the inlet openings (15) are located proximal to the apex of the sidewalls (14) opposite the base (12) of the dosing chamber (4). The base (12) of the dosing chamber (4) may be chamfered to form an inclined surface extending from the sidewalls (14) to the discharge opening (13). Preferably, said inclined surface extends substantially linearly from said sidewalls (14) to said discharge opening (13). Such configuration allows the liquid to drain from the dosing chamber (4) in an effective manner without leaving any left-behind residue, particularly in locations proximal to the sidewalls (14), which would otherwise cause jamming of the plunger upon drying.

The ratio of the total surface of inlet openings (15) and the timer apertures (16) is between 2 to 17, preferably from 6 to 12, more preferably from 6 to 9, most preferably 6 to 8 and the viscosity of the liquid is from 1 to 600 mPa·s, preferably from 40 to 600 mPa·s, more preferably from 40 to 300 mPa·s, even more preferably from 80 to 300 mPa·s, even more preferably 80 to 250 mPa·s and most preferably from 80 to 220 mPa·s (measured at $10 \text{ s}^{-1}$ at 20° C.). Advantages of such configuration will become apparent with reference to the below passages and figures.

The plunger is preferably in the form of a piston (5) and is moveable relative to the dosing chamber (4) so as to advance upon squeezing of the inverted container (2). The piston (5) moves from a starting position—wherein the piston (5) is at its furthest position from the entry tube (10), up to a blocking position—wherein at least part of the piston (5) contacts the entry tube (10) so as to close it and terminating the dose. Preferably the motion of the piston (5) is linear and parallel to the longitudinal axis (YY), however, it is understood that any other kind of motion such as rotation and combination of rotation and translation may be equally suitable for generating a dose.

The valve retaining means (6) is located below the base (12) of the dosing chamber (4) and may extend vertically downward from said base (12) in a direction substantially parallel to the longitudinal axis (YY). Preferably, the valve retaining means (6) is one part with the dosing chamber (4). This allows to reduce the number of parts required and contributes towards introducing benefits such as reduced manufacturing complexity and cost, and ease of assembly.

The valve (7) is preferably uni-directional (i.e. it opens and closes in one direction only) and is provided in the retaining means (6). The valve (7) is moveable from an open position—allowing liquid to flow through the discharge opening (13), and a closed position—wherein the valve blocks said discharge opening (13).

In a preferred embodiment, said valve (7) may be spherical in shape and may be capable of blocking the discharge opening (13) by at least partly entering the dosing chamber (4). Preferably, said valve may be capable of contacting at least part of the piston (5) when said piston (5) is in its starting position and said valve (7) is in its closed position. Such configuration allows easy and accurate location of the valve into the discharge opening upon squeezing of the container (2) with no need for a specific orientation to be maintained. Another advantage is that by allowing the valve (7) to at least partly enter the dosing chamber (4), said valve (7) acts as a precursor and pushes up the piston so as to overcome any initial jamming of said piston (5).

Figure 4:
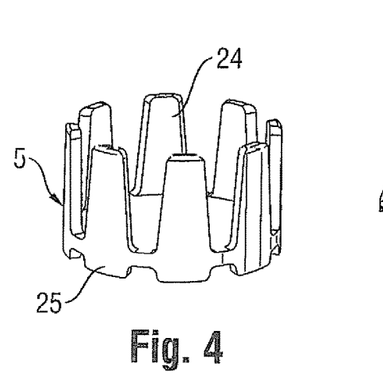
FIG. 4 is an isometric view of a piston of the dosing apparatus according to a preferred embodiment of the present invention.

In a preferred embodiment, as illustrated in both FIG. 3 and FIG. 4, the piston (5) may have a substantially flat surface, preferably a flat surface, and may comprise stabilizing wings (24) extending upwardly and substantially parallel to the longitudinal axis (YY). Preferably, the root of said stabilizing wings (24) may be located along the circumference of said piston (5). Said stabilizing wings may be spaced apart so as to minimize material used and any friction with the sidewalls (14) of the dosing chamber (4). The diameter of said piston (5) may be smaller than the diameter of said dosing chamber (4) to further reduce any friction effects between the surfaces thereof. Preferably, said piston (5) may further comprise protrusions (25) extending opposite and mirrored to said stabilizing wings (24) wherein said protrusions (25) are of smaller length than said stabilizing wings (24). Without being bound by theory, it is believed that an advantage of the flat configuration of the piston is that the pressure differential is minimized between the liquid flowing through the inlet openings (15) and the liquid flowing through the timer apertures (16), thus rendering the rate of climb of the piston (5) and consequently the dosage, dependant primarily on the ratio of the surface of the openings and the viscosity of the liquid. A further advantage is introduced by the protrusions (25), which reduce contact with the base (12) of the dosing chamber (4), thus minimizing jamming of the piston (5).

Figure 5:
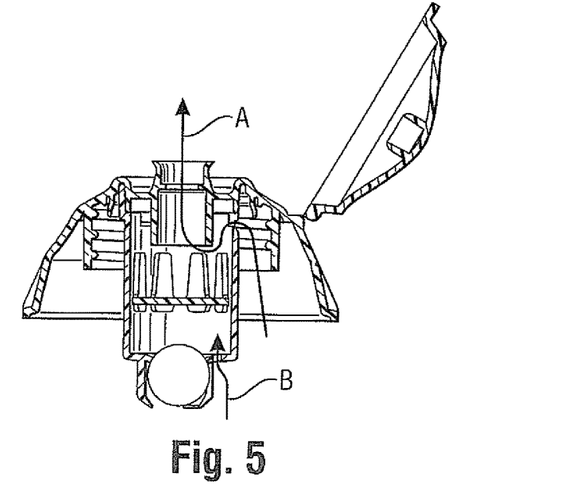
FIG. 5 is an axial cross-section of an embodiment of the present invention illustrating the flow path of the liquid into the dosing chamber.

Referring to FIG. 5, when a force is applied to the inverted container (2), said container (2) experiences buckling and concurrently generates a pressure within said container (2) which causes the valve (7) to close the discharge opening (13). The liquid is consequently forced to flow into the dosing chamber (4) via the timer apertures (16) and the inlet openings (15). The flow path of the liquid is shown by arrows A and B of FIG. 5. The part of the liquid that flows through the timer apertures (16) pushes the piston (5) towards the entry tube (10), whilst the part of the liquid that flows through the inlet openings (15) is directly expelled from the container (5) through the entry tube (10) and out of the nozzle (8). Once the piston reaches the entry tube (10) liquid flow is stopped and the dose complete. Releasing the force from the inverted container (2) causes the resilient spring-back of the container surfaces and allows the vacuum, formed during squeezing and buckling of the container (2), to open the valve (7) and effectively drain the dosing chamber (4) while the piston returns to its starting position. At the same time the volume above the piston fills with air which is pulled in via the nozzle(8), venting the container (2) to bring the deformed container (2) back to its starting form. At this point a new dose may be dispensed by simply squeezing again said container (2) without needing to rotate the apparatus (1) back to the upright position.

Figure 6:
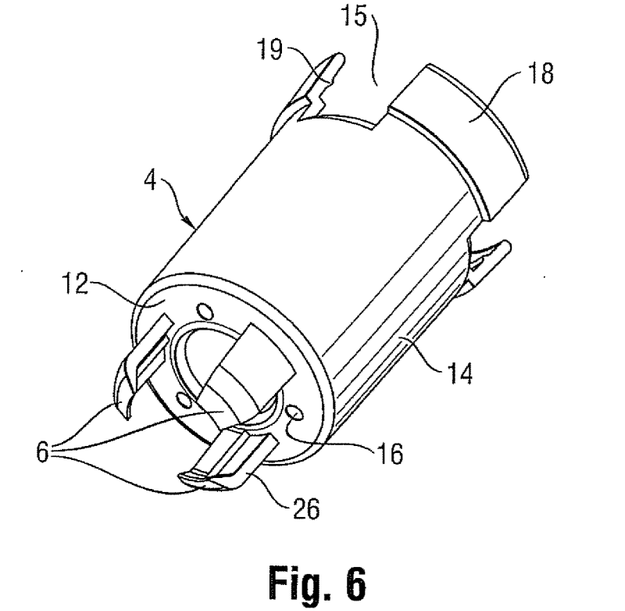
FIG. 6 is an isometric view of a dosing chamber of the dosing apparatus according to a preferred embodiment of the present invention.

Referring to FIG. 3 and FIG. 6, in a preferred embodiment of the present invention the dosing chamber (4) may comprise sidewalls (14) extending vertically upwardly along the perimeter of base (12) and parallel to the longitudinal axis (YY), and at least two tabs (18) extending vertically upwardly from the apex of said sidewalls (14) in a direction opposite to said base (12). The tabs (18) may be spaced apart so as to form a castellation on the upper portion of the dosing chamber (4). Such tabs (18) may define inlet openings (15) formed by the open space between said tabs (18). Preferably, the perimeter of said base (12) may be substantially circular, however it is understood by the person skilled in the art that other shapes may also be suitable such as oval, squared, triangular and so on. This configuration allows for ease of manufacture of the inlet openings (15). More preferably, the dosing chamber comprises multiple tabs (18) forming multiple inlet openings (15).

In one embodiment the tabs (18) may further comprise a notch (19) which may follow the contour of the inside face of said tabs (18) and extend a predetermined length towards the longitudinal axis (YY), for compliance with a groove (20) located on a surface of the cap (3). Preferably, said surface of cap (3) faces opposite to said longitudinal axis (YY) and is located on a first skirt (21). Said first skirt (21) may extend downwardly and substantially parallel to said longitudinal axis (YY) from a first surface of the cap (3). The dosing chamber (4) may be connected to the cap (2) by snap fitting said tabs (18) to said first skirt (21). Such a construction allows for ease of assembly.

In an alternative embodiment said dosing chamber (4) may be one part with said cap (3). Preferably, in this embodiment the nozzle (8), orifice (9) and entry tube (10) are comprised in a separate spout component which is connected to the cap (3) via a snap fit or the like. The snap fit may be such that a non-removable connection is achieved between said spout component and said cap (3). More preferably, the connection may be such that the distance between the entry tube (10) of said spout component and the base (12) of said dosing chamber (4) may be varied upon rotation of said spout component relative to said cap (3). Even more preferably, the spout component may comprise shutter tabs extending from a surface of the spout component proximal to the connecting portion such that upon rotation of said spout component relative to said cap (3) the size of the inlet openings (15) is changed. By "connecting portion" it is meant herein, the portion on the spout component wherein connection with said cap (3) is achieved.

In a preferred embodiment the timer apertures (16) may be located in the base (12) of the dosing chamber (4). Preferably, said timer apertures (16) may be proximal to the discharge opening (13) and the centre line of said timer apertures (16) may be parallel to the centre line of said discharge opening (13). An advantage of such configuration is that laminar flow is maintained which serves to apply a constant and balanced force on the piston. Without wishing to be bound by theory, it is believed that turbulent flow may destabilize the smooth movement of the piston.

In a particularly preferred embodiment (not shown), the timer apertures (16) may be in the form of multiple slots extending for a predetermined length from the discharge opening (13) towards the sidewalls (14) through the base (12) of the dosing chamber (4). In this particular embodiment, the piston (5) comprises a ring-like protrusion extending from the base thereof in a direction substantially parallel to the longitudinal axis (YY) towards said base (12). The said ring-like protrusion may be capable of closing the multiple slots and the discharge opening (13) when in its starting position by being in relative contact with the corresponding surface of said base (12) of said dosing chamber (4). An advantage of this configuration is that bubbling through the timer apertures is significantly reduced and even prevented when the filled container is inverted without squeezing it. Without wishing to be bound by theory, it is believed that when holding the apparatus (1) in its inverted position, particularly when at an angle or when the liquid in the container has been partly depleted, air may flow through the timer holes causing a back pressure differential that results in some of the liquid to flow in the dosing chamber (4) through the inlet openings (15) and leak. Consistent dosing is therefore improved over different tilt angles and also at different container fill levels.

Figure 8A:
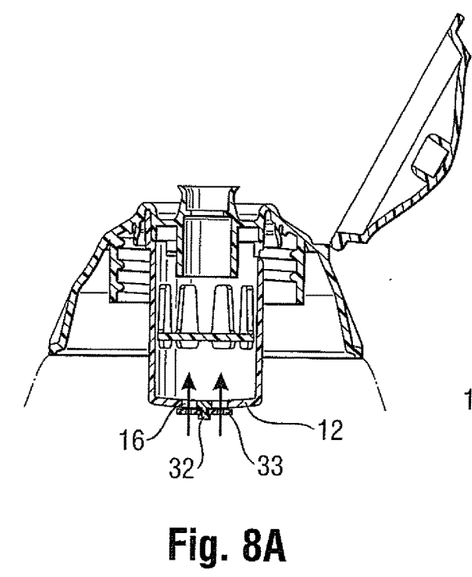
FIG. 8A is an axial cross-section of another embodiment of the dosing apparatus.
Figure 8B:
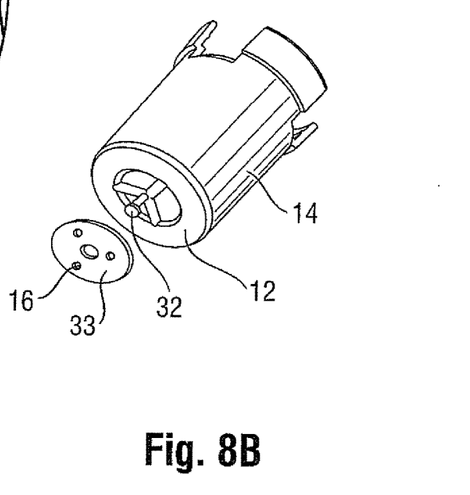
FIG. 8B is an exploded view of a dosing chamber and valve of the dosing apparatus according to the embodiment illustrated in FIG. 8A.
Figure 9:
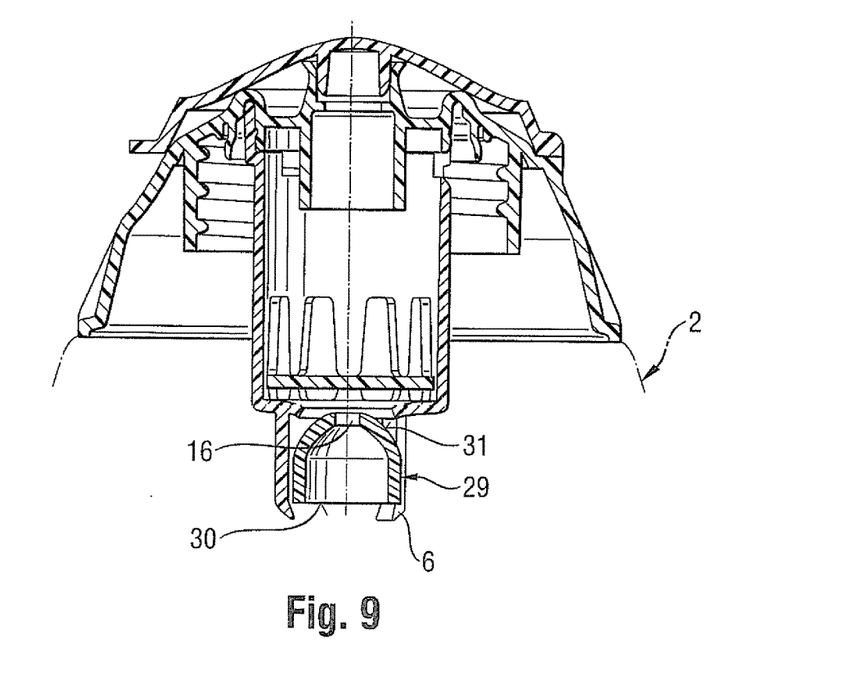
FIG. 9 is an axial cross-section of another embodiment of the dosing apparatus.

In further embodiments the timer apertures (16) may be located in and/or through the valve (29, 33), as illustrated in FIG. 8A-B and FIG. 9.

In a preferred embodiment, the base (12) of the dosing chamber (4) may be chamfered in such a way to define a first area and a second area. Preferably, said first area may be demarcated by the sidewalls (14) of the dosing chamber (4), and said second area may define the circumference of the discharge opening (13). More preferably, the said second area is located below said first area and the centerline of said first area coincides with the centerline of said second area.

Figure 7:
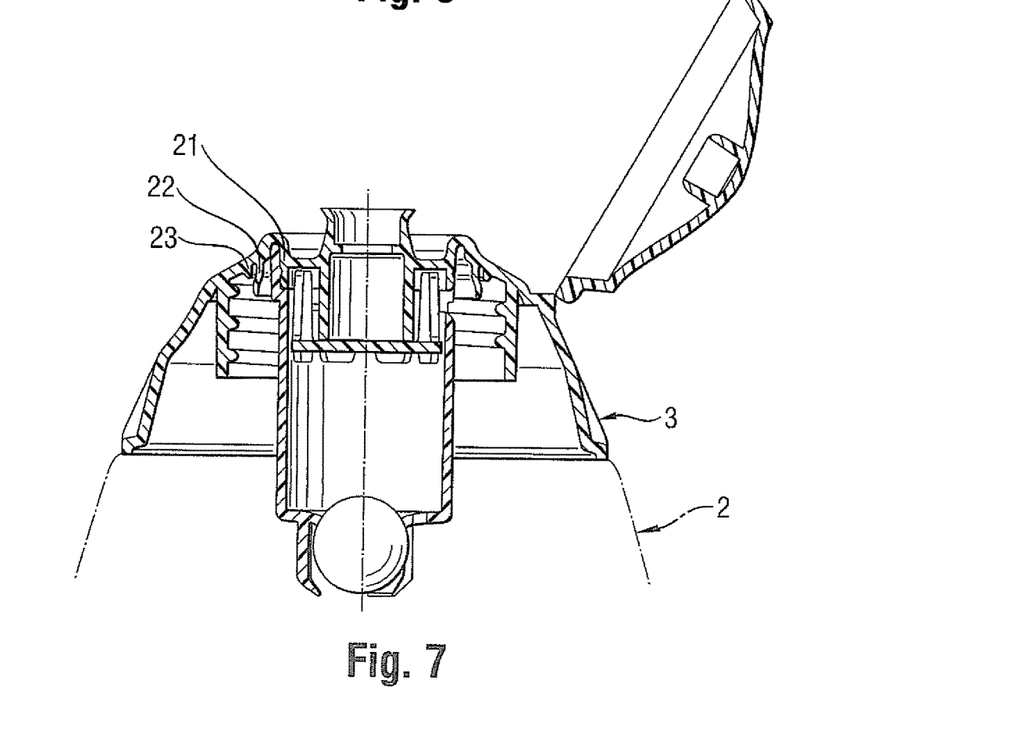
FIG. 7 is a cross-section taken along the line A-A of FIG. 1A of the dosing apparatus according to one embodiment of the present invention.

Referring to FIG. 7, in an embodiment of the present invention, the cap (3) may comprise a second skirt forming a plug seal (22) extending downwardly proximal to the first skirt (21), and a v-shaped notch (23) proximal to said second skirt (22). The plug-seal (22) and the V-shaped notch (23) may be capable of at least partly engaging with the uppermost surface of the container (2) so as to provide a secure sealing means and prevent leakage during dosage. An advantage of such a configuration is the reduction in the number of parts, since an additional sealing means such as an O-ring or the like is no longer required.

In an embodiment (not shown) of the present invention, the first skirt (21) may comprise shutter tabs in the form of spaced flanges or the like to at least partly cover at least one of the inlet openings (15). Alternatively, the first skirt (21) may have shutter tabs formed by portions of the first skirt (21) subtending at a variable vertical distance taken from a plane substantially parallel to the longitudinal axis (YY) to form a series of preferably linear gradients along the entire circumference of said first skirt (21). In this embodiment the first skirt (21) may be rotatable with respect to the dosage chamber (4) so as to allow variation in the size of the inlet openings (15). This allows greater flexibility in dosage whereby the user can dispense different amounts of liquid by rotating the cap (3) which in turn changes the size of said inlet openings and thus the ratio of the surface of said inlet openings (15) and the timer apertures (16).

In a further embodiment of the present invention, the entry tube (10) is capable of displacing both upwardly and downwardly in a direction parallel to the longitudinal axis (YY) upon rotation of the cap (3). Without wishing to be bound by theory it is believed that changing the height of the entry tube (10) reduces the travel distance of the piston thus allowing the user to dose different quantities of liquid by simply rotating cap (3).

In a preferred embodiment of the present invention, as illustrated in FIG. 6, the valve retaining means (6) may be formed by at least three flexible hook-shaped protrusions (26) extending downwardly from said base (12) in a direction opposite to the sidewalls (14) of the dosing chamber (4) and substantially parallel to the longitudinal axis (YY). An advantage of such hook shaped protrusions (26) is the simplification of the de-molding operation during manufacturing by allowing pull-off from the injection mold without complex slides in the mold. A further advantage is that said hook shaped protrusions (26) allow to assemble the valve (7) easily via push-fit, while minimizing contact between said valve (7) and said hook shaped protrusions (26) which aids in preventing blockage.

In a further embodiment the retaining means (6) may further comprise at least one flat panel extending downwardly from said base (12) and substantially parallel to the longitudinal axis (YY). Said panels are preferably located in the gaps formed between the hook-shaped protrusions (26). This configuration allows to securely locate the valve (7) inside the retaining means (6) in a child-proof manner by preventing the removal of the valve (7) once inserted.

In a preferred embodiment (not shown) the valve retaining means (6) may be formed by at least two overhangs, preferably at least three overhangs, extending downwardly from said base (12) in a direction opposite to the sidewalls (14) of the dosing chamber (4) and substantially parallel to the longitudinal axis (YY). In this embodiment, a snap ring may join to the apex of said overhangs so as to define a valve insertion opening at the centre thereof. The snap ring may extend towards the centre of the valve insertion opening, and may be inclined at an angle from a plane perpendicular to said longitudinal axis (YY). Preferably, said angle is about 35° prior to the insertion of the valve through the valve insertion opening and deforms in a direction towards said base (12) when the valve is pushed through the valve insertion opening. The resulting angle of said snap ring after valve insertion is preferably −45° taken along said plane perpendicular to said longitudinal axis (YY). Preferably, said overhangs and said snap ring are one part with said dosing chamber (4). An advantage of this configuration is that potential entanglement of dosing chambers during the manufacturing procedure is avoided.

In another embodiment of the present invention, illustrated in FIG. 8A and FIG. 8B, the valve retaining means (6) may be formed by a projection (32) extending from said base (12) in a direction opposite to said sidewalls (14) and may engage with a flexible one-way disc valve (33) with a very low cracking pressure (i.e. low minimum upstream pressure at which the valve will operate). The valve (33) may be engaged to said valve retaining means (6) via a central snap fit or other means which allows movement of said valve (33) relative to said projection (32). The valve (33) may be substantially flat and circular in shape, although it is understood that other shapes may also be suitable such as dome shaped and/or umbrella shaped. The valve (33) may have timer apertures (16) extending therein. An advantage of such configuration is that the total size of the dosing chamber may be reduced together with reduced complexity in view of the simple central snap fit.

In an embodiment of the present invention, illustrated in FIG. 9, the valve (29) may be bullet shaped. Said bullet shape is defined by a substantially flat surface (30) on one end and a substantially convex surface (31) on the opposite end. The valve (29) may be inserted into the valve retaining means (6) via a snap fit or other means which allows movement of said valve (29) relative to said valve retaining means, the valve retaining means (6) guiding the valve (29) and preventing it from changing orientation. The flat surface of said valve may have an opening subtending more than 50% of the diameter of said valve (29) and the convex surface (31) may have one or more timer apertures (16) located proximal to the apex of said convex surface. The valve (29) may be oriented so that the convex surface (31) faces the discharge opening (13) and the flat surface (30) faces the inside of the container (2). An advantage of such configuration is ease of manufacture of the valve.

Figure 1A:
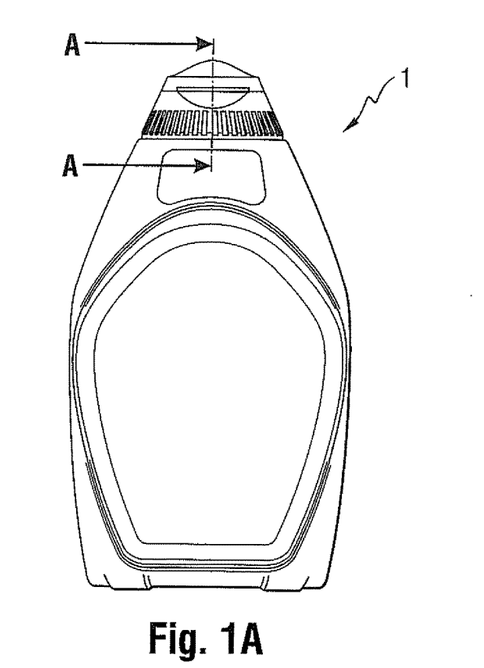
FIG. 1A is a front view of the dosing apparatus according to one embodiment of the present invention.
Figure 1B:
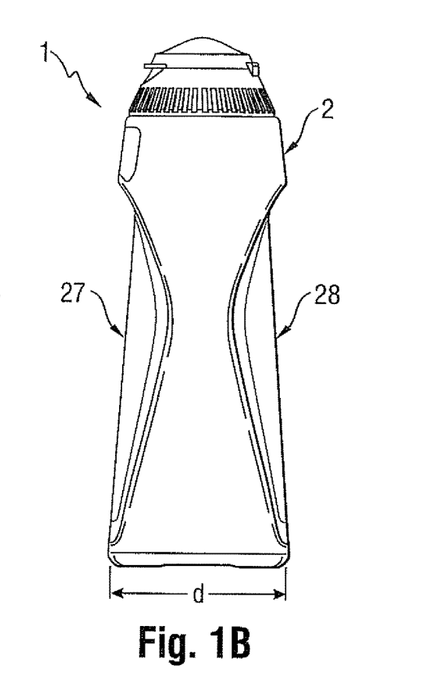
FIG. 1B is a side view of the dosing apparatus according to one embodiment of the present invention.

Referring to FIG. 1B, in a preferred embodiment the container (2) may comprise a front (27) and a back (28) surface in a facing relationship. Preferably, said front (27) and back (28) surfaces have a larger surface area compared to the other surfaces of the container (2) and are spaced apart so that the distance (d) between said front (27) and back (28) surfaces is between 30 mm to 100 mm. This specific range has been found to be optimal for allowing the user to correctly and comfortably grip the container and squeeze effectively.

The container (2) may be made of any flexible material, however, preferably said material is selected from the group consisting of PP, PET, PE or blends thereof. Said container (2) may be capable of displacing from 5 ml to 150 ml, preferably from 10 ml to 80 ml, of liquid without experiencing permanent deformation. Without being bound by theory it is believed that permanent deformation will create cracks in the container or cause paneling (i.e. the panels do not return to the starting position) which in turn reduce the displacement volume with each use, affecting the consistency of the dosage.

In a preferred embodiment (not shown), the container (2) may comprise an indicating means to indicate to the user the acceptable inclination angle of the apparatus (1) for effective dosage. Indeed, in some operations the user may need to angle the apparatus (1) due to space restrictions or simply comfort. However, tilting the apparatus (1) at too shallow angles may result in loss of accuracy of the dosage, particularly if air starts flowing through the inlet openings (15). This may be particularly true when the liquid is close to depletion. It may therefore be necessary to incline the apparatus (1) as much as possible but in such a way that the liquid still covers said inlet openings (15). An indicating means allowing the user to see when said liquid covers said inlet openings (15) may be desirable. Preferably, said indicating means is a transparent window located on said container (2) proximal to the connecting portion of the cap (3) with said container (2). Alternatively, said indicating means may be an entirely transparent container. A further advantage of such configuration is that the depletion of the liquid may be inspected by the user and the correct functioning of the valve and piston communicated.

An advantage of the present invention is that constant dosage can be achieved substantially independently from pressure fluctuations caused by variations in the squeezing force and the fill level of the container during use. Indeed, in a particular aspect of the present invention, it has been found that the volume dosed may be defined by the following equality (I), $$\text{Volume dosed} = \text{flow rate/time} = \{\min[\text{inlet opening, orifice}]/\text{timer aperture}\} \times C \times R \times P \quad \text{(I)}$$

Where,

The inlet opening, orifice and timer aperture refer to the total surface areas thereof.

C is a constant determined by the container geometry, in particular the fixed dimensions of the dosing chamber (4) and the travel distance of the piston (5).

R is a rheology factor. This constant is determined by rheology as a function of viscosity profile, the shear applied and the type of flow (laminar, transitional or turbulent).

P is the pressure applied to the liquid. P is determined by subtracting the squeeze force applied over a specific surface of the container by the pressure losses during deformation of the container and by pressure losses in compressing air (full to empty conditions).

It has been found that pressure does not substantially affect the dosage, with the most important parameters for constant dosage being the ratio of the total surface of the inlet openings and timer apertures. Without wishing to be bound by theory, it is believed that so long as a sufficient pressure is applied to begin fluid flow, the pressure generated on the top surface of the plunger and that generated on the bottom surface of said plunger reaches a balance so as to not affect constant dosage. Suitable pressures are typically between 2 kPa and 12 kPa, preferably between 2 kPa and 10 kPa, more preferably between 2 kPa and 7 kPa, and most preferably between 2 kPa and 5 kPa. On the other hand, increasing the pressure by squeezing the container with a greater force may increase the speed of dosage.

Figure 11:
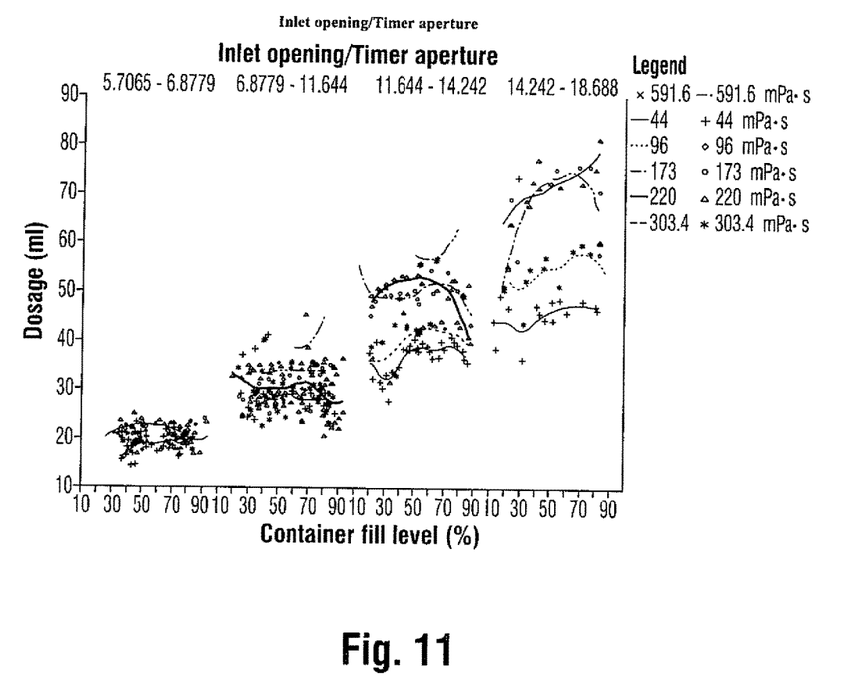
FIG. 11 is a graph showing the dosage variation throughout different container fill levels as a function of the ratio of inlet opening/timer aperture surfaces for a wide range of viscosities.

Referring to FIG. 11, the dosage at different container fill levels for a number of different inlet opening (15) and timer aperture (16) ratios is shown for liquids having a broad range of viscosities. FIG. 11 illustrates that at higher ratios, greater variation in the dosage occurs at different container fill levels.

Figure 12:
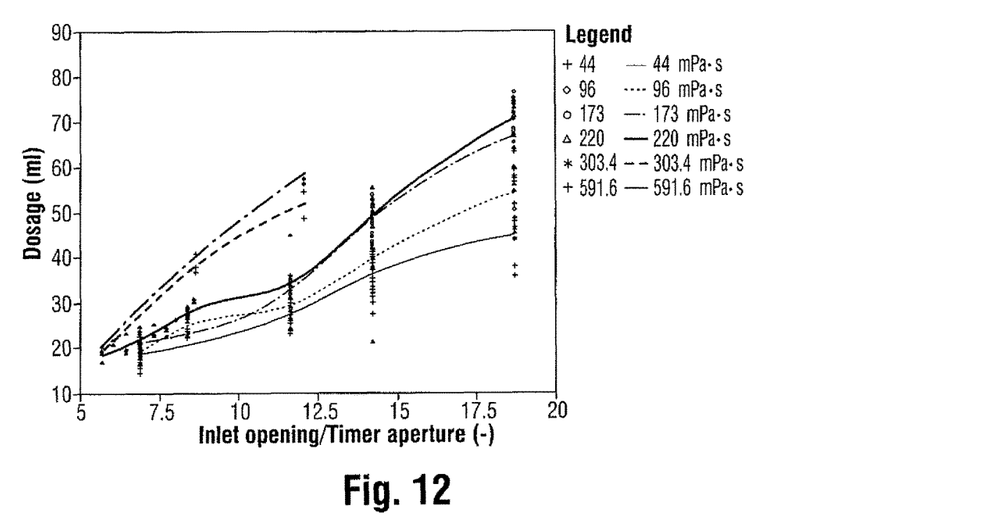
FIG. 12 is a graph showing the dosage as a function of the ratio of inlet opening/timer aperture surfaces for a range of viscosities.

Referring to FIG. 12, the dosage delivered is shown as a function of the ratio of the inlet opening/timer aperture surfaces for a range of different viscosities. FIG. 12 illustrates an almost linear relationship between the quantity being dosed and the abovementioned ratio, dosage increasing with an increase in ratio of inlet opening/timer aperture surfaces.

Figure 13:
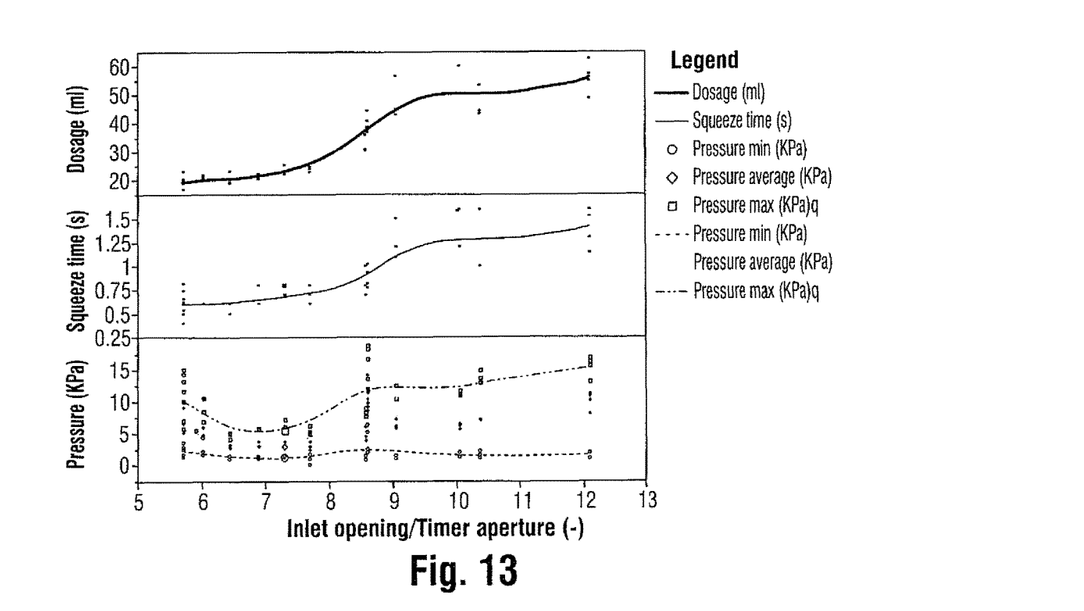
FIG. 13 is a graph showing pressure, squeeze time and dosage as a function of the ratio of inlet opening/timer aperture surfaces.

Referring to FIG. 13, the pressure variation from start to end of dosage is shown for a number of different inlet opening (15) and timer aperture (16) ratios. The same figure shows how dosage varies with inlet opening (15) and timer aperture (16) ratios at the indicated pressures. FIG. 13 also shows the squeeze time at the given ratios of the inlet opening/timer aperture at the indicated pressures. FIG. 13 therefore illustrates that a lower variation in pressure occurs during dosage when the ratio of the total surface of the inlet openings (15) and timer apertures (16) is typically from 6 to 9, preferably from 6 to 8. FIG. 13 also shows that particularly for ratios of typically 6 to 9, preferably 6 to 8, dosage is substantially independent from pressure resulting in a substantially predictable and constant dosage being achieved. FIG. 13 further illustrates that at squeeze times typically higher than 1 s, a greater variation in dosage occurs.

In an embodiment of the present invention, the dosage time is therefore typically less than or equal to 1.5 s, preferably less than or equal to 1 s and more preferably less than or equal to 0.75 s. Without wishing to be bound by theory it is believed that if the time of squeeze is too high, the user will apply a more variable squeezing force with the greatest force being applied towards the end of the squeeze resulting in the user experiencing an undesired fatigue especially in circumstances where multiple doses are required.

The tests for generating the data illustrated in FIG. 11 to FIG. 13 are carried out by assembling and weighing the apparatus of the present invention when empty. The container of the apparatus is then filled with a liquid composition and weighed again, to calculate the accurate fill level. For pressure measurements, a sensor glove (Tekscan I-scan Grip system) is fitted over the hand that will be squeezing the container. Tekscan equipment I-scan Grip system equipped with sensor model 4256E and a synchronized video camera is set up to measure pressure and squeeze time. In all tests the apparatus is then rotated from its standing vertical position for an angle of about 135° and the container squeezed until the dosage is stopped. The apparatus is weighed again to calculate the accurate dosage delivered and new fill level. The apparatus is then left to stand in its vertical resting position for about 10 seconds to make sure the liquid is allowed to exit the dosing chamber. The tests are repeated for different ratios of inlet opening/timer aperture and for liquids having different viscosities ranging from 40 mPa·s to 600 mPa·s measured at 10 $s^{-1}$ at 20° C. (taken with an AR 1000 from TA instruments with a 2° 1' 5" cone angle spindle of 40 mm diameter with truncation of 57 micrometer). The tests are repeated twice for each condition.

It has been found that the ratio of the total surface of the inlet openings (15) and the orifice (9) may also affect the dose, in particular if the total surface of the orifice is smaller than the total surface of the inlet openings. However, if the orifice (9) is too large, dripping may occur which would require the introduction of additional features to minimize said dripping such as silicone or thermoplastic elastomers (TPE) slit-seal valves and/or cross-shaped cuts in the orifice. Preferably, the ratio of the total surface of said inlet openings (15) and said orifice (9) may be from 4 to 0.25, preferably 1.

The viscosity of the liquid may also impact the accuracy and speed of dosage. It has been found that liquids having a Newtonian-type rheology profile and viscosity outside the below-mentioned ranges would deliver unsatisfactory consistency in dosage. It has surprisingly been found that viscosities within the range of 1 to 600 mPa·s, preferably 40 to 300 mPa·s, more preferably from 40 to 250 mPa·s, even more preferably 80 to 220 mPa·s, measured at 10 $s^{-1}$ at 20° C. will deliver a constant dosage irrespective of liquid fill level (i.e. throughout the depletion of the liquid from the container). The viscosity measurements were taken with an AR 1000 from TA instruments with a 2° 1' 5" cone angle spindle of 40 mm diameter with truncation of 57 micrometer.

Compositions suitable for use in the apparatus of the present invention are formulated as liquid compositions, preferably comprising water, more preferably in an amount from 10% to 99% by weight of the total composition. Suitable compositions may be acidic or alkaline or both, and may further comprise abrasive cleaning particles, suspending aids, chelating agents, surfactants, radical scavengers, perfumes, surface modifying polymers, solvents, builders, buffers, bactericides, hydrotropes, colorants, stabilizers, bleaches, bleach activators, suds controlling agents like fatty acids, enzymes, soil suspenders, anti dusting agents, dispersants, pigments, thickeners, and/or dyes.

Method of Use

Figure 10A:
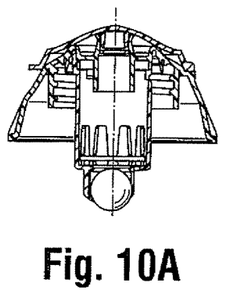
FIG. 10A to C are axial cross-sections of an embodiment of the present invention illustrating the positioning of the piston and valve in the various phases of dispensing.
Figures 10B, 10C:
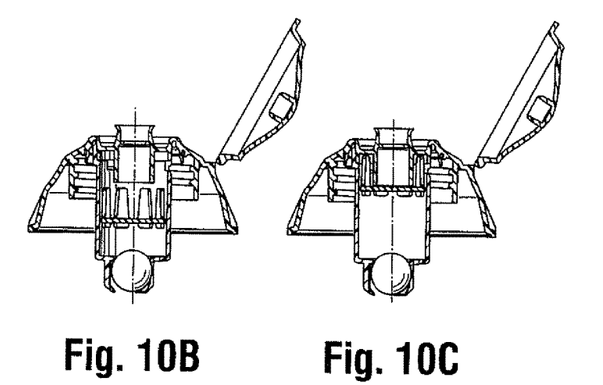

FIG. 10A-C illustrate an example of the operation of apparatus (1). FIG. 10A illustrates the resting position of apparatus (1), prior to use. The user disengages the top lid (17) or opens the orifice (9) and inclines the apparatus (1) top down, in a substantially inverted position. The user then squeezes the container (2) with one hand to a apply a pressure of from 2 kPa to 12 kPa, preferably 2 kPa to 10 kPa, more preferably from 2 kPa to 7 kPa, and most preferably from 2 kPa to 5 kPa, to begin the dosage. The liquid flow causes the valve (7) to close the discharge opening (13) and the liquid to flow through the timer apertures (16) causes the piston (5) to move towards the entry tube (10). Concurrently the liquid forced through the inlet openings (15) is discharged through the entry tube (10) and out of the nozzle (8). FIG. 10B shows the apparatus (1) in its dosing arrangement with the piston (5) at its mid position. The user may squeeze said container for no more than 1.5 seconds, preferably no more than one second, to complete the dose. The volume of liquid dosed for each squeeze of the container (2) may be from 1 ml to 80 ml, preferably from 3 ml to 40 ml, more preferably 10 ml to 30 ml, and even more preferably 10 ml to 25 ml. FIG. 10C illustrates the arrangement of apparatus (1) at the end of the dosage. Once the piston (5) reaches the entry tube (10) so as to close it, the dose is complete and the user may release the force from said container (2). The valve is then opened by the pressure differential generated as the resilient container (2) deforms back to its original shape, and the liquid is discharged into the container (2) through the discharge opening (13) allowing the piston (5) to return to its starting position. The user may now re-squeeze said container (2) to dispense a new dose, without the need of re-inverting the apparatus (1). This process may be repeated for all subsequent dosages as necessary.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dosing apparatus for dispensing a dose of liquid comprising:
   (i) A resiliently squeezable container;
   (ii) A cap operably connected to said container, said cap comprising a nozzle, wherein said nozzle defines an orifice at its apex;
   (iii) A dosing chamber operably connected to said cap, wherein said dosing chamber comprises a base having a discharge opening therein, sidewalls extending upwardly along the perimeter of said base and at least one inlet opening located proximal said sidewalls;
   (iv) At least one timer aperture located proximal to said discharge opening;
   (v) A plunger, provided in said dosing chamber and moveable relative to said chamber so as to advance upon squeezing of said container, up to a blocking position;
   (vi) A valve retaining means located below said base;
   (vii) A valve provided in said valve retaining means wherein said valve is movable from an open position, allowing liquid flow through said discharge opening, and a closed position, where the valve blocks said discharge opening;
wherein the ratio of the total surface of said inlet openings and said timer apertures is from 2 to 12, wherein the viscosity of said liquid is from 1 to 600 mPa·s (measured at 10 s$^{-1}$ at 20° C.), wherein the dosing apparatus dispenses a dose of liquid at a substantially constant liquid output, wherein said base defines a first area and a second area, said first area being demarcated by said sidewalls and said second area defining the discharge opening, and wherein said second area is located below said first area, and wherein said at least one timer aperture is in the form of at least one slot extending for a predetermined length from said discharge opening towards the sidewalls through said base of said dosing chamber, and said plunger comprises a ring-like protrusion wherein said ring-like protrusion is capable of closing said at least one slot and said discharge opening when resting onto said base.

2. An apparatus according to claim 1 wherein said plunger is a piston having a flat surface and comprises stabilizing wings extending upwardly along the perimeter of said piston and protrusions extending opposite and mirrored to said stabilizing wings, and wherein said protrusions are of shorter length than said stabilizing wings.

3. An apparatus according to claim 1 wherein said at least one timer aperture is located in said base of said dosing chamber and wherein said at least one timer aperture is parallel to said discharge opening.

4. An apparatus according to claim 1 wherein said dose is from 3 ml to 40 ml.

5. An apparatus according to claim 1 wherein said container comprises a front surface and a back surface, and wherein the distance between said front to said back surfaces is between 30 mm to 100 mm.

6. An apparatus according to claim 1 wherein said container is capable of displacing from 15 ml to 80 ml of said liquid without permanent deformation.

7. An apparatus according to claim 1 wherein said sidewalls comprise a castellation formed by vertically extending tabs at the apex thereof, and wherein said inlet openings are defined by the open space between said tabs, and wherein said castellation comprises multiple inlet openings.

8. An apparatus according to claim 1 wherein said valve retaining means is one part with said dosing chamber and is formed by at least three hook-shaped protrusions extending downwardly from said base and opposite to said sidewalls.

9. An apparatus according to claim 1 wherein said valve retaining means is one part with said dosing chamber and comprises at least two overhangs, extending downwardly from said base, and a snap ring joining to the apex of said overhangs so as to define a valve insertion opening at its centre.

10. An apparatus according to claim 1 wherein said valve is spherical and is capable of blocking said discharge opening by at least partly entering said dosing chamber.

11. An apparatus according to claim 1 wherein the ratio of the total surface of said inlet openings and said orifice is from 4 to 1:4.

12. An apparatus according to claim 1 wherein said cap further comprises a first skirt comprising shutter tabs capable of at least partly covering said inlet openings upon rotation of said cap relative to said dosing chamber.

13. An apparatus according to claim 1 wherein said container comprises an indicating means to indicate to the user the acceptable inclination angle of said apparatus for accurate dosing.

14. A method of dosing with an apparatus of claim 1, comprising the steps of;
   (i) orienting said apparatus top down, (ii) squeezing said container to begin dosage until liquid flow stops, and (iii) releasing the force from said container to permit said valve to open, release said liquid from said dosage chamber via said discharge opening and allow said plunger to return to its starting position.

15. A method according to claim 14 wherein following step (iii) the container is squeezed again to begin a second dose without inverting said container.

16. A method of dosing a liquid with an apparatus, said method comprising:
   (a) A resiliently squeezable container;
   (b) A cap operably connected to said container comprising a nozzle, wherein said nozzle defines an orifice at its apex;
   (c) A dosing chamber operably connected to said cap, wherein said dosing chamber comprises a base having a discharge opening therein, sidewalls extending upwardly along the perimeter of said base and at least one inlet opening located proximal said sidewalls;

(d) At least one timer aperture located proximal to said discharge opening;

(e) A plunger, provided in said dosing chamber and moveable relative to said chamber so as to advance upon squeezing of said container, up to a blocking position;

(f) A valve retaining means located below said base;

(g) A valve provided in said retaining means wherein said valve is movable from an open position, allowing liquid flow through said discharge opening, and a closed position, where the valve blocks said discharge opening;

said method comprising the steps of; (i) orienting said apparatus top down, (ii) squeezing said container to generate a pressure of from 2 kPa to 12 kPa which pressure is applied to a liquid in said container, for no more than one second, to complete the dose, (iii) releasing the force from said container to permit said valve to open, release said liquid from said dosage chamber via said discharge opening and allow said plunger to return to its starting position, wherein the ratio of the total surface of said inlet openings and said timer apertures is from 2 to 12 and wherein the dosing apparatus dispenses a dose of liquid at a substantially constant liquid output, wherein said base defines a first area and a second area, said first area being demarcated by said sidewalls and said second area defining the discharge opening, and wherein said second area is located below said first area, and wherein said at least one timer aperture is in the form of at least one slot extending for a predetermined length from said discharge opening towards the sidewalls through said base of said dosing chamber, and said plunger comprises a ring-like protrusion wherein said ring-like protrusion is capable of closing said at least one slot and said discharge opening when resting onto said base.

17. A method of dosing according to claim 16 wherein following step (iii) said container is squeezed again to begin a second dose without inverting said container.

* * * * *